Oct. 16, 1928.
G. M. WRIGHT
1,687,746
DIRECTIONAL AERIAL
Filed April 19, 1921
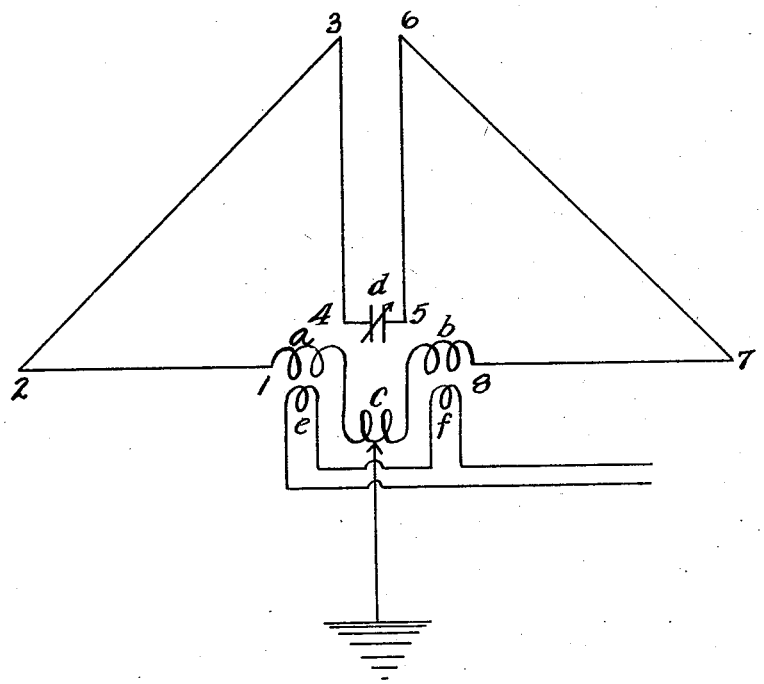
Inventor
G. M. WRIGHT
By his Attorney Patented Oct. 16, 1928.

1,687,746

UNITED STATES PATENT OFFICE.

GEORGE MAURICE WRIGHT, OF LONDON, ENGLAND, ASSIGNOR TO RADIO CORPORATION OF AMERICA, A CORPORATION OF DELAWARE.

DIRECTIONAL AERIAL.

Application filed April 19, 1921, Serial No. 462,625, and in Great Britain July 18, 1918.

(GRANTED UNDER THE PROVISIONS OF THE ACT OF MARCH 3, 1921, 41 STAT. L., 1313.)

Applications have been filed in Great Britain, July 18, 1918 Patent No. 124,138; Australia, June 15, 1920; Belgium, July 5, 1920; Brazil, June 30, 1920; Ceylon, June 2, 1920; Cuba, June 1, 1921; Denmark, January 28, 1920; France, July 1, 1920; Germany, June 3, 1920; Italy, June 8, 1920; Japan, June 30, 1920; New Zealand, June 22, 1920; Norway, December 31, 1919; Portugal, May 18, 1920; Poland, July 8, 1920; Spain, May 6, 1920; Sweden, December 24, 1919, for this invention.

In the case of directional aerials of the frame type earthed at the middle point of the base member for the purpose of minimizing electrostatic interference, it is necessary to use a closed frame without a condenser, or with an inaccessible condenser at the top, or with a split condenser at the bottom. For general use such arrangements are inconvenient.

According to this invention I employ in a frame aerial a pair of symmetrical leads which are brought down vertically from the top of the aerial to a condenser in a convenient position for adjustment, and I provide preferably in the middle of the transformer winding an adjustable connexion to earth so that the latter may be made at the node of potential.

In order to keep the transformer winding symmetrical and to make the earth connexion readily adjustable to the potential node, I prefer to use a split winding, and between the two portions of this winding to connect an inductance with an adjustable earthed contact.

My invention is illustrated by the accompanying diagram. 1 2 3 4 5 6 7 8 is a triangular frame aerial and 3 4, 6 5 are leads coming vertically down to a condenser $d$ which is adjustable for the purpose of tuning. $a$ and $b$ are the two portions of the transformer winding which are respectively coupled to the coils $e$ and $f$ and are connected together through an inductance $c$ to any point of which an earth connexion may be made.

For direction finding or for balancing circuits for duplex telegraphy I employ two or more of such aerial systems arranged symmetrically with respect to one another. The portions of the transformer windings in the various systems then form the field coils of the direction finder of the balancing circuit.

Having described my invention, what I claim is:

1. A directional frame aerial having an adjustable condenser located in an accessible position and connected in series with said aerial and in its top by a pair of symmetrical leads and having in its base a split winding with an earth connexion between the two portions thereof.

2. The combination of a loop aerial in a vertical plane, an adjustable condenser located near the base of the loop, symmetrical leads connecting said condenser in series with the upper conductor of the loop, and a coil in the lower conductor having an intermediate point connected to ground.

3. The combination of a loop aerial, means for connecting said loop to an indicating circuit, means to connect said loop to the ground, and a variable condenser located at the base of said loop and connected in series with said loop by symmetrical leads at a point substantially electrically equidistant from said last mentioned means and at the top of said loop.

4. The combination of a loop aerial, means for connecting said loop to an indicating circuit, means to connect said loop to the ground, and a variable condenser located at the base of said loop connected in series with said loop by symmetrical leads at a point substantially electrically opposite to said last mentioned means and at the top of said loop.

5. In radio signalling apparatus, a loop aerial having a transformer associated therewith, comprising two substantially symmetrical primary sections connected in series with each other and with said aerial, a winding interposed between said sections and having an adjustable connection to ground from an intermediate point thereon and said transformer comprising a pair of substantially symmetrical secondary windings, each coupled to one of said primary sections and a condenser located in an accessible position and connected in series in the top of said loop, the leads to said condenser being substantially symmetrical.

6. The combination of a closed loop aerial mounted in a vertical plane, a variable condenser mounted near the base of said loop, symmetrical leads connecting said condenser in series with and to the top of said loop, a coil connected in the base of the loop, and a variable connection between said coil and ground.

GEORGE MAURICE WRIGHT.